United States Patent [19]

Katsube et al.

[11] 4,347,423

[45] Aug. 31, 1982

[54] ELECTRIC DISCHARGE MACHINE

[75] Inventors: Hideo Katsube, Hachioji; Gotaro Gamo, Komae; Yoshiyuki Nomura; Kanemasa Okuda, both of Hino, all of Japan

[73] Assignee: Fujitsu Fanuc Limited, Tokyo, Japan

[21] Appl. No.: 156,396

[22] Filed: Jun. 4, 1980

[30] Foreign Application Priority Data

Jun. 15, 1979 [JP] Japan .................................. 54-75277

[51] Int. Cl.³ .............................................. B23P 1/08
[52] U.S. Cl. .............................. 219/69 W; 219/69 S; 188/65.1; 188/67
[58] Field of Search ................ 219/69 W, 69 S, 69 C, 219/69 M, 69 R; 188/65.1, 67

[56] References Cited

U.S. PATENT DOCUMENTS

| | | | |
|---|---|---|---|
| 2,544,086 | 3/1951 | Herrington | 188/65.1 X |
| 3,987,270 | 10/1976 | Ullmann et al. | 219/69 W |
| 4,093,042 | 6/1978 | Pradon | 188/67 |
| 4,233,486 | 11/1980 | Inoue | 219/69 W |
| 4,242,559 | 12/1980 | Roemer et al. | 219/69 W |

FOREIGN PATENT DOCUMENTS 2071481 9/1971 France ............................... 188/65.1

*Primary Examiner*—B. A. Reynolds
*Assistant Examiner*—M. Paschall
*Attorney, Agent, or Firm*—Staas & Halsey

[57] ABSTRACT

A wire or band electrode type electric discharge machine for machining hard metals by an electric spark generated between the metal workpiece and a wire electrode which is fed longitudinally to provide a fresh supply thereof while a prescribed relative motion is established between the workpiece and the wire electrode. The invention provides a clamping mechanism on the wire supply side of the workpiece for clamping the wire electrode if it breaks during operation, and a wire electrode feed mechanism for automatically guiding the broken end of the wire through the opening that has been machined in the workpiece. A wire electrode pull-up mechanism is provided on the other side of the workpiece for gripping and pulling up the wire electrode. If the electrode wire breaks during a machining operation, the clamping mechanism immediately clamps the wire electrode and prevents it from falling under its own weight. Thereafter the wire electrode feed mechanism draws the broken wire electrode away from the surface of the workpiece and then reinserts the broken end through the opening until the end of the wire emerges from the opposite side. The wire electrode pull-up mechanism the grips the end of the wire and pulls it to a new position to restore operation after it has been released by the clamping mechanism.

10 Claims, 16 Drawing Figures

(1) SL1
(2) SFR
(3) RFR
(4) FFR
(5) SL4
(6) FHM
(7) RHM
(8) SL2
(9) COI
(10) SL3
(11) SUC

ELECTRIC DISCHARGE MACHINE

BACKGROUND OF THE INVENTION

This invention relates to an electric discharge machine, and more particularly to improvements in a wire-cut or band-cut electric discharge machine which is adapted to permit automatic repair of the wire or band electrode should the electrode break during a machining operation.

An electric discharge machine which uses a wire or band electrode as a cutter establishes a voltage differential between the electrode and a workpiece to induce an electrical discharge or spark in the intervening space. The machine moves the workpiece relative to the wire electrode on the basis of data representative of machining instructions, thereby allowing the workpiece to be machined into a desired shape owing to the action of the electrical discharge. There are occasions where the electrode breaks within the workpiece during the machining operation if such machining conditions as the applied voltage and feed speed are improper. In such an event, the operator repairs the broken electrode by pulling it upwardly through a lower guide, passing it again through the hole or slot which has been machined in the workpiece, and then fastening it to a take-up mechanism after passing it through an upper guide. Restoring the wire electrode in this manner so that machining can resume from the former position requires a considerable amount of time and results in diminished machining efficiency. Moreover, since the intervention of the operator is necessary to repair the broken wire electrode, the discharge machining operation will not be able to resume if the wire should break during unattended operation.

BRIEF SUMMARY OF THE INVENTION

It is therefore an object of the present invention to provide a wire or band electrode-type electric discharge machine which permits machining to be resumed a short time after breakage of the electrode, and which enables repair of the broken electrode without the intervention of human labor.

It is another object of the present invention to provide a wire or band electrode-type electric discharge machine in which a broken electrode on the electrode supply side can always be sent back to the supply reel side and then re-introduced from the supply reel side.

It is still another object of the present invention to provide a wire or band electrode-type electric discharge machine in which the end of a broken electrode can be automatically and reliably guided to a prescribed location on a positioned workpiece in effecting the repair of the electrode.

It is a further object of the present invention to provide a wire or band electrode-type electric discharge machine in which the end of a broken electrode which has been passed through a workpiece can be automatically and reliably grasped and guided to a prescribed position in effecting the repair of the electrode.

Other features and advantages of the invention will be apparent from the following description taken in connection with the accompanying drawings.

DETAILED DESCRIPTION OF THE PREFERRED EMBODIMENT

Figure 1:
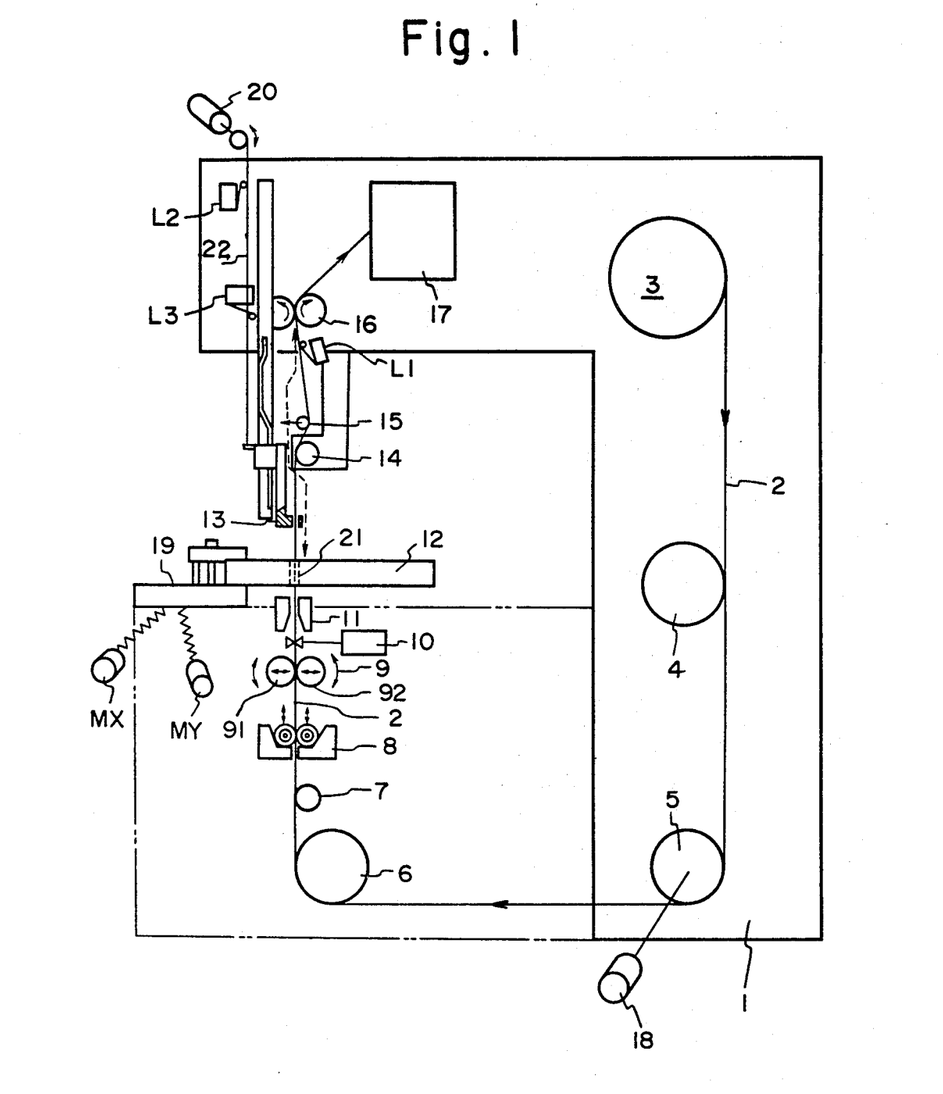
FIG. 1 is a front view showing, in simplified form, the essential mechanical portions of a wire electrode-type electric discharge machine in accordance with the present invention.

The general construction of the electric discharge machine of the present invention can best be understood from FIG. 1 which shows the interrelationship among the principal operating mechanisms. The machine includes a column 1 for support, a wire electrode 2 for machining a workpiece 12, wherein it is to be understood that the electrode may also be in the form of a band, a wire electrode supply reel 3, a tension brake 4, guide rollers 5 and 6, a lower guide 7, a clamping mechanism 8, a wire electrode feed mechanism 9, a wire electrode position detecting mechanism 10, a nozzle 11 located immediately below the machining position, a wire electrode pull-up mechanism 13, an upper guide 14, a conduction pin 15 for supplying the wire electrode with electric power, a feed roller mechanism 16, a wire electrode disposing apparatus 17, an encoder 18 operatively coupled to the guide roller 5, a worktable mechanism 19, workpiece feed motors Mx, My for moving the worktable, and hence the workpiece 12, in X and Y directions, respectively, a motor 20 for driving the wire electrode pull-up mechanism 13, a limit switch $L_1$ employed in detecting breakage of the wire electrode 2, a limit switch $L_2$ which detects when the lowering of the wire electrode pull-up mechanism 13 has been completed, and a limit switch $L_3$ which detects when the elevation of the pull-up mechanism has been completed.

The wire electrode 2 is guided substantially vertically between the upper and lower guides 14, 7 and is fed upwardly by the feed rollers 16 to travel past the machining portion of the machine where the workpiece 12 is located. A prescribed voltage is applied between the wire electrode 2 and the workpiece 12, and the latter is moved in a horizontal plane by the feed motors Mx, My in a predetermined manner so as to be machined along a desired path by the wire electrode.

In accordance with the preferred embodiment, the clamping mechanism 8 is provided on the supply side of the wire electrode 2 and is adapted to clamp a portion of the wire electrode instantaneously upon breakage, thereby preventing it from falling under its own weight. Meanwhile the wire feed mechanism 9 and nozzle 11 for grasping and feeding the wire electrode on the supply side cooperate to position the upper end of the broken wire electrode on the supply side of the workpiece, said upper end of the wire being brought to a predetermined position thereby. This allows the portion of the broken wire electrode remaining on the supply side to be passed again through a hole or slot 21 machined in the workpiece 12 so that the wire can be delivered to the upper guide 14, the feed roller 16 and eventually the disposing apparatus 17. The foregoing sequence, which begins when the wire electrode breaks, is performed fully automatically.

Figure 2:
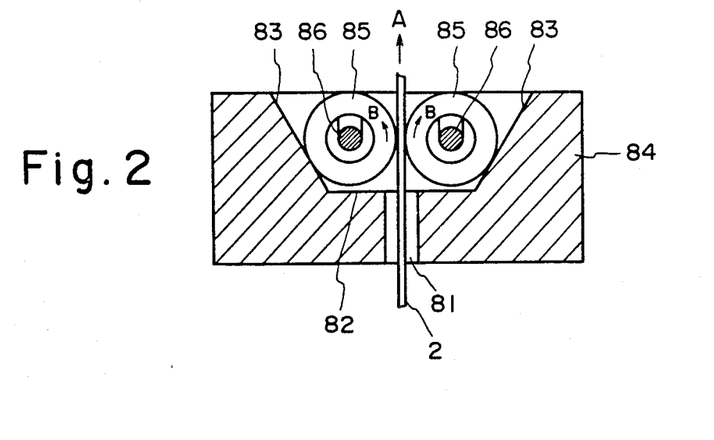
FIGS. 2 and 3 are front views showing a wire electrode clamping mechanism.
Figure 3:
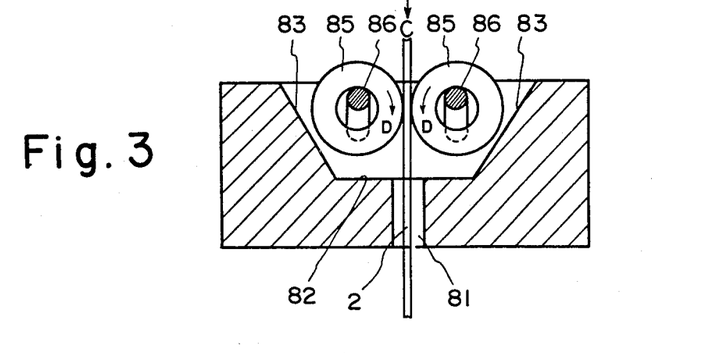
Figure 4:
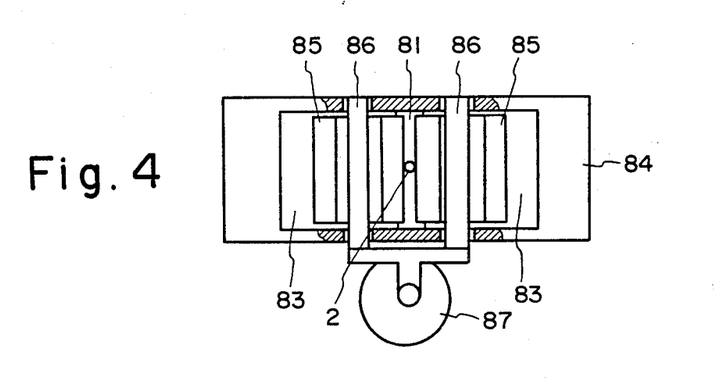
FIG. 4 is a top view of the clamping mechanism.

The structure and operation of the wire electrode clamping mechanism 8 can best be understood from FIGS. 2 through 4. The clamping mechanism 8 includes a pair of knurled rollers 85 set into a block 84 having a slit 81 to permit passage of the electrode wire therethrough, a pair of inclined walls 83 defining an inwardly tapered surface, and a bottom surface 82. The rollers 85 are loosely mounted on corresponding shafts 86 that are allowed to occupy either the positions shown in FIG. 2 or FIG. 3 by activating or deactivating a plunger magnet 87.

The plunger magnet 87 is deactivated during the course of a normally proceeding discharge machining operation, so that the rollers 85 are positioned as shown in FIG. 2. The rollers 85 rotate freely in the directions indicated by the arrows B as the wire electrode 2 is fed upwardly in the direction shown by the arrow A, and therefore permit the upward passage of the wire through the block 84. If the electrode wire 2 should now break in the vicinity of the workpiece 12, the portion of the wire above the rollers 85 will no longer be tensioned and the wire will tend to be pulled downward under its own weight. However, the pair of rollers 85, owing to their knurled surfaces and in cooperation with the inwardly inclined walls 83, function to grasp and clamp the wire electrode immediately upon breakage. The plunger magnet 87 is then activated to move the shafts 86 to the positions shown in FIG. 3, thereby disengaging the rollers 85 from the inwardly inclined walls 83 so that the rollers can now rotate in the directions of the arrows D to permit the downward passage, shown by the arrow C, of the wire electrode 2. The rollers 85 are of course still free to rotate in the directions B when required, and therefore allow the wire electrode to be moved upwardly through the block 84, that is, in the direction A, when this step in the repair of the wire is carried out as will be described later.

Referring now to FIGS. 5 through 8 for a detailed description of the structure and operation of the wire feed mechanism 9, a pair of drive rollers 91, 92 are coupled to a motor 99 through respective shafts 93, 94 and gear mechanisms 95, 96, 97 and 98. The shafts 93, 94 are journalled in bearings 100, 101 attached to one end of respective leaf springs 102, 103, and a plunger magnet 109 is connected to the bearings 100, 101 through a lever mechanism comprising lever elements 104, 105, 106, 107 and 108.

Figure 5:
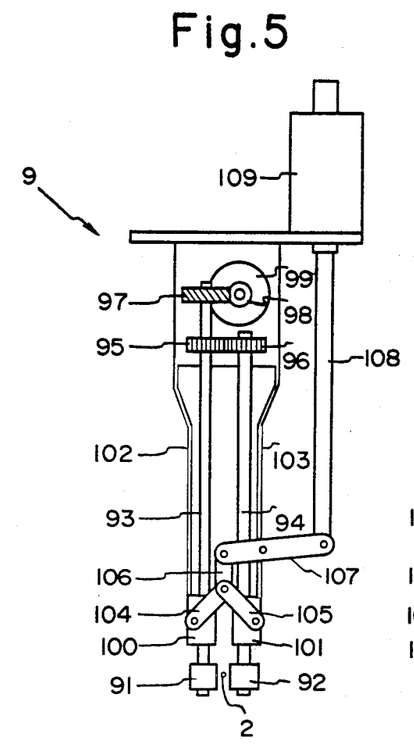
FIGS. 5 and 6 are top views of a wire electrode feed mechanism.

The magnet 109 of the wire feed mechanism 9 is deactivated during the course of the machining operation, so that the drive rollers 91, 92 are spaced from each other and do not contact the wire electrode 2, as illustrated in FIG. 5. The magnet 109 is activated only if the wire electrode breaks. When such is the case, the magnet 109 depresses the lever element 108 in the direction of the arrow, thereby pivoting the lever element 107 clockwise about its pivot point and causing the lever elements 106, 105, 104 to co-operate in moving the shafts 93, 94 toward each other against the biasing force of the leaf springs 102, 103 so as to bring the bearings 100, 101, and hence the drive rollers 91, 92, closer together until the wire electrode 2 is grasped between them. Motor 99 acting through the gear mechanism and shafts 93, 94 rotates the drive rollers 91, 92 and, when driven in one direction, causes the drive rollers to draw the wire electrode upward, and when driven in the other direction, causes the drive rollers to pass the wire electrode downward, the possible directions of drive roller movement being shown in FIG. 1.

The detector 10 shown in FIG. 1 is normally in contact with the wire electrode 2 and operates in association with the motor 99. When the wire electrode breaks and is pulled downward by the wire feed mechanism 9 after being clamped by the clamping mechanism 8, the detector 10 detects the end of the broken wire as it passes by, and delivers a signal indicative of this fact to the motor 99. The signal halts the motor so that the drive rollers 91, 92 which are pulling down the broken wire electrode 2 are stopped before the end of the wire reaches them. The broken end of the wire electrode is now located below the workpiece and remains there until the arrival of a signal, to be described later, which causes the wire electrode feed mechanism 9 to feed the wire upwardly by a prescribed amount through the machined hole in the workpiece.

Figure 9:
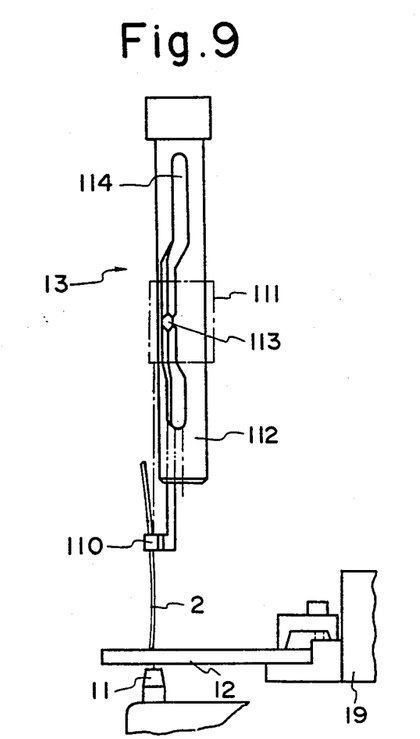
FIG. 9 is a front view of a wire electrode pull-up mechanism.
Figure 10:
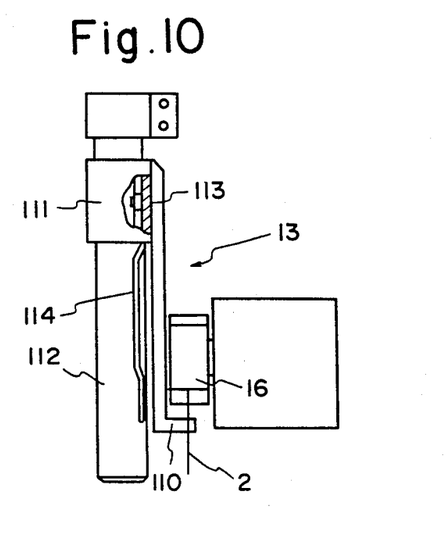
FIGS. 10 through 13 are diagrams useful in describing the operation of the wire electrode pull-up mechanism.

Meanwhile the pull-up mechanism, shown in detail in FIGS. 9 through 13, is to be moved into position to await the arrival of the wire electrode. The mechanism includes a wire electrode gripping portion 110, a sliding portion 111 interconnected therewith, and a shaft portion 112, as shown in FIGS. 9 and 10. The sliding portion 111 is capable of sliding vertically along the shaft portion 112 and has a pin 113 which is engaged with a cam slot 114 formed in the shaft portion 112, whereby the sliding portion 111 in moving vertically along the shaft portion is constrained to turn in a particular manner which is decided by the shape of the cam slot 114. The sliding portion 111 is turned as described above in order that the pull-up mechanism 13 will not interfere with the upper guide 14 at the stage where the wire electrode 2 is set between the feed rollers 16 shown in FIG. 1. The gripping portion 110 includes a hole 116 having a tapered wall portion 115, and receives a knurled roller 117.

Figure 11:
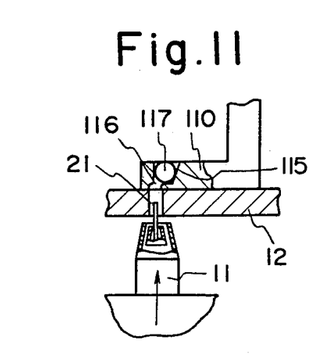
Figure 12:
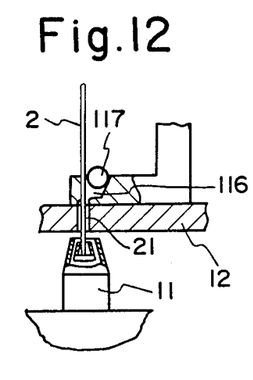
Figure 13:
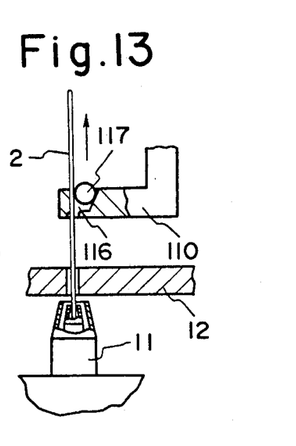

In operation, the gripping portion 110 is lowered via a cord 22 by actuating the motor 20, the cord and motor being shown in FIG. 1. The cord 22 slackens when the gripping portion 110 comes to rest upon the upper surface of the workpiece 12, and the limit switch $L_2$ opens upon sensing the slack in the cord, thereby deactivating the motor 20. The result is illustrated in FIG. 11, in which the gripping portion 110 is shown flush against the upper surface of the workpiece 12, with the hole 116 in alignment with the hole 21 in the workpiece. When the wire electrode feed mechanism 9 described above feeds the wire electrode 2 upwardly by a prescribed amount, the end of the wire electrode passes through the hole 21 in the workpiece 12, pushes up the roller 117 and passes through the hole 116 in the gripping portion 110, the end of the electrode finally emerging in the space above the gripping portion 110, as depicted in FIG. 12. Running the motor 20 in the reverse direction to elevate the gripping portion 110 via the cord 22 now causes the roller 117 to wedge the wire electrode 2 against the wall portion of the hole 116, as shown in FIG. 13, so that the wire electrode is pulled upwardly along with the gripping portion 110. When the latter has reached its maximum elevation the limit switch $L_3$ is closed to halt the motor 20. At this time the upper end of the wire electrode 2 has been pulled up to a position high enough to permit it to be engaged by the feed rollers 16, the latter then being driven to feed the wire electrode grasped therebetween. Before the end of the wire electrode is introduced into the feed rollers 16, however, it is necessary to retract the conduction pin 15 to permit proper delivery of the wire electrode from the upper guide 14. This is accomplished by the conduction pin retraction mechanism illustrated in FIG. 14.

Figure 14:
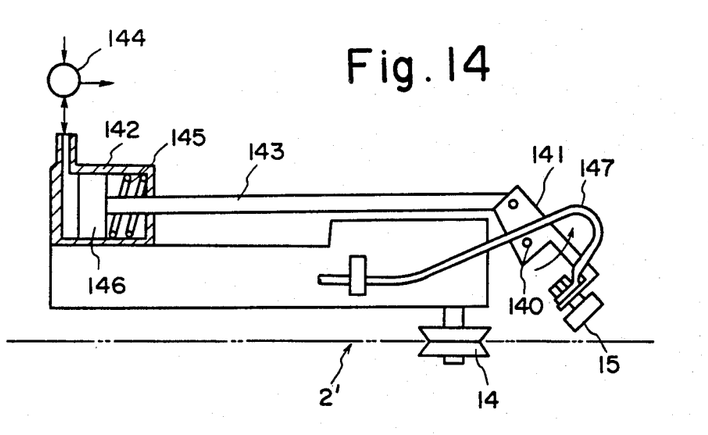
FIG. 14 is a rear view of a conduction pin retraction mechanism.

With reference to FIG. 14, the conduction pin 15 is mounted on a lever 141 which is capable of being rotated about a pivot point 140 by a piston rod 143 connected at one end to the lever 141 and at the other end to a piston 146 within a cylinder 142. Opening a valve 144 communicates the interior of the cylinder 142 with the atmosphere and allows a spring 145 to urge the piston 146, and hence the piston rod 143, to the left as shown in FIG. 14. This causes the lever 141 to rotate counter-clockwise about the pivot point 140 so that the conduction pin 15 is swung away from the path 2' along which the wire electrode 2 will travel. This facilitates the introduction of the wire electrode 2 from the guide 14 to the feed rollers 16.

On the other hand, closing the valve 144 sends a pressurizing fluid into the cylinder 12 so that the piston 146 and its piston rod 143 are driven as far to the right as possible, thereby rotating the lever 141 counter-clockwise. This swings the conduction pin 15 back into the position shown in FIG. 1 and allows the pin to contact the wire electrode 2 once the latter has entered the feed roller mechanism 16. Numeral 147 in FIG. 14 designates a cable for connecting the conduction pin 15 to a power source.

It should be noted that a nozzle for supplying a machining liquid can also be mounted on the above retraction mechanism together with the conduction pin so that the nozzle can also be swung away from the wire electrode. Furthermore, the machining liquid can be employed as the pressurizing fluid delivered to the cylinder 142.

Figure 15:
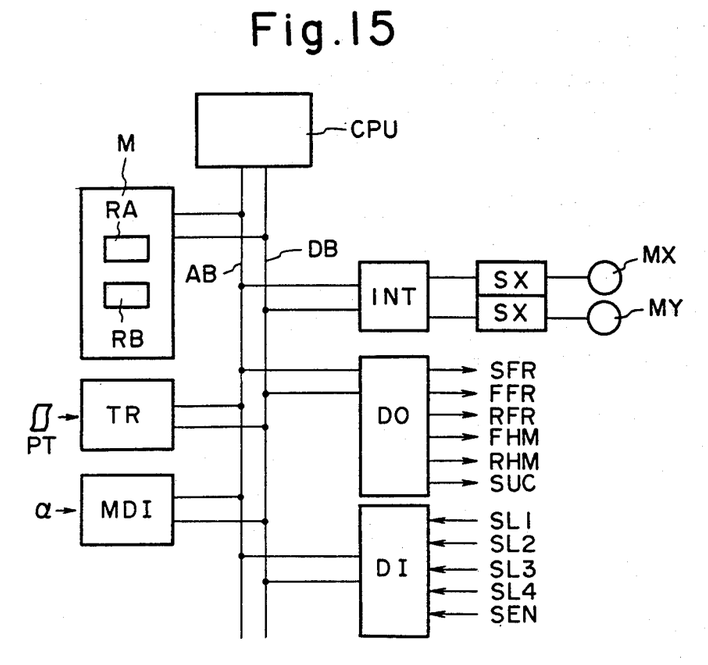
FIG. 15 is a block diagram of the numerical control portion of the wire electrode-type electric discharge machine of the present invention.

The numerical control unit for the electric discharge machine of the present invention is shown in FIG. 15. The unit relies upon an electronic computer and is of the type which is well known in the art, and includes a central processing unit CPU, a memory M, a tape reader TR, a manual data input unit MDI, an interpolator INT, a digital output unit DO, and a digital input unit DI, the central processing unit CPU being connected to the other units via an address bus AB and a data bus DB. The workpiece feed motors Mx, My are connected to the interpolator through servo circuits Sx, Sy, respectively.

Data concerning the relative movement of the workpiece and wire electrode are recorded on a punched tape PT. Such data, which are instructions that determine table feed and the amount of table movement, are successively read from the tape as dictated by a prescribed control program. The interpolator INT interpolates the data in a well known manner and delivers pulsed signals to the servo circuits Sx, Sy that actuate the motors Mx, My. In the present embodiment, the motors drive the workpiece relative to the wire electrode.

Figure 6:
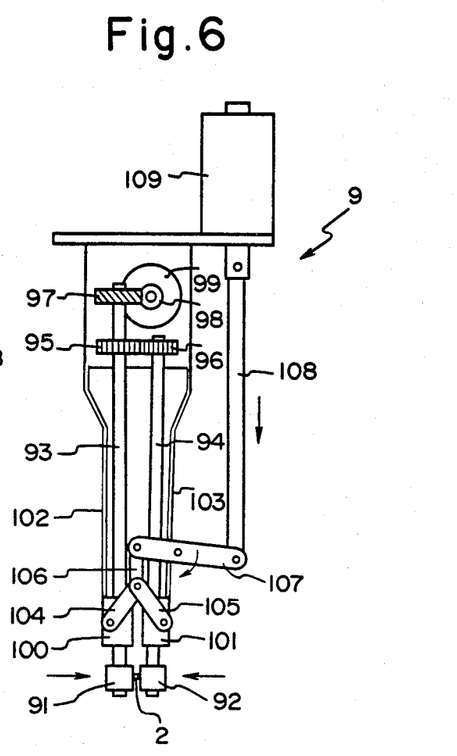
Figure 7:
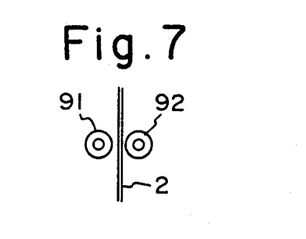
FIGS. 7 and 8 are diagrams useful in describing the operation of the wire electrode feed mechanism.
Figure 8:
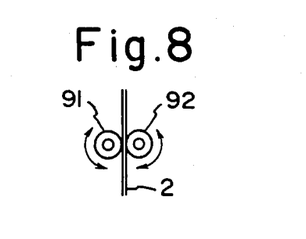
Figure 16:
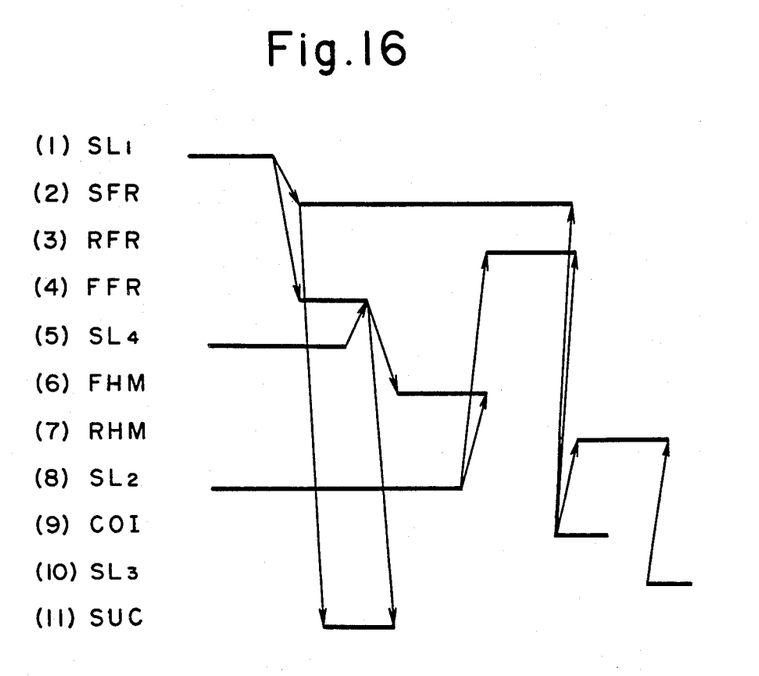
FIG. 16 is a timing chart useful in describing machine operation.

The overall operation of the electric discharge machine of the present invention can best be understood from the timing chart shown in FIG. 16. If the wire electrode 2 should break in the vicinity of the workpiece 12 during a machining operation which is shown in progress in FIG. 1, the tension in the wire electrode will vanish at the location of the break and that portion of the wire electrode on the supply side will be drawn downwardly under its own weight. The clamping mechanism 8, however, clamps this portion of the electrode immediately after breakage. Meanwhile, that portion of the wire electrode on the side of the repair apparatus loses tension along the lower length thereof, and this is detected by the limit switch $L_1$ which opens. A signal $SL_1$ resulting from the opening of the limit switch $L_1$ is read by the central processing unit CPU through the digital input unit DI, and signals SFR, FFR are issued through the digital output unit DO. The signal SFR is applied to the magnet 109 shown in FIGS. 5 and 6 and activates the magnet so that the wire electrode on the supply side is grasped between the drive rollers 91, 92. The period during which the wire electrode is so clamped is indicated by line (2) in FIG. 16. The signal FFR, in concurrence with the operation just described, is applied to the motor 99 shown in FIGS. 5 and 6, and causes the motor to rotate in the forward direction. The rollers 91, 92 are driven by the motor 99 so as to pull back and completely extract the wire electrode from the workpiece. At this time a signal SUC is being applied to the magnet 82 in FIG. 4. The magnet 87 is activated by the signal and shifts the rollers 85 to the non-clamping position as shown in FIG. 3. Thus, when the wire electrode is pulled back by the rollers 91, 92 as described above, the clamping mechanism 8 offers no resistance. This interval is shown by line (11) in FIG. 16. When the wire electrode has been pulled back from the workpiece to such an extent that the upper end of the wire passes by the position detector 10, which is shown in FIG. 1, the resulting detection signal $SL_4$ is read by the central processing unit CPU through the digital input unit DI, and the digital output unit DO no longer delivers the signal FFR, thereby stopping the motor 99 which is shown in FIGS. 5 and 6. This transition is illustrated by lines (5) and (4) in FIG. 16. Magnet 87 is now deactivated so that the rollers 85 of the clamping mechanism 8 are moved to the positions shown in FIG. 2 to clamp the wire electrode.

Next, the central processing unit CPU outputs a signal FHM through the digital output unit DO. The signal starts the motor 20, depicted in FIG. 1, and the motor begins to lower the gripping portion 110 of the wire electrode pulling mechanism 13. When the gripping portion 110 reaches the upper surface of the workpiece 12, as shown in FIG. 11, the resulting slack in the cord 22 is sensed by the limit switch $L_2$ which now opens. The CPU reads the resulting signal $SL_2$, and the signal FHM vanishes from the digital output unit DO. The discontinuation of signal FHM halts the motor 20 so that the gripping portion 110 is brought to a stop immediately after contacting the upper surface of the workpiece. These sequences are shown by lines (8) and (6) in FIG. 16. Soon after the signal $SL_2$ is read, a signal RFR is supplied by the digital output unit DO, which signal causes motor 99 to start rotating in the reverse direction. The motor 99, shown in FIGS. 5 and 6, now causes the drive rollers 91, 92 to advance the tip of the wire electrode 2 toward the workpiece 12, and to eventually pass the tip through the hole 21 located in the workpiece, and the hole 116 located in the gripping portion 110, as illustrated in FIGS. 11 and 12. Lines (8) and (3) in FIG. 16 represent the above sequence. The amount by which the wire electrode 2 is fed in this manner will depend upon the thickness of the workpiece. A feed quantity predetermined in accordance with workpiece thickness is therefore entered beforehand via the manual data input unit MDI and is set in the register area RA of the memory M. The encoder 18 which is operatively coupled to the guide roller 5, as shown in FIG. 1, delivers a pulsed signal SEN to the digital input unit DI of FIG. 15, the signal is read, and the pulses that constitute the signal are counted in the register area RB of the memory M. The central processing unit CPU executes the counting operation and compares the contents of the register areas RA and RB during the feed of the wire electrode through the workpiece and the gripping portion 110, and issues a coincidence signal COI when the register areas RA, RB are in coincidence. At such time the signals SFR, RFR are interrupted and thus are no longer supplied by the digital output unit DO. The foregoing operation is depicted by the lines (9), (3) and (2) in FIG. 16. The detection of coincidence also results in the generation of a signal RHM that causes the conduction pin 15 to swing away from the path 2' of the wire electrode 2 and that causes the motor 20 to start rotating in the reverse direction. The motor therefore elevates the gripping portion 110 until the latter reaches its maximum upper limit, this being sensed by the limit switch $L_3$ which now closes. The resulting signal $SL_3$ is read by the CPU, the signal RHM is interrupted, the conduction pin 15 is swung back to its original position so as to contact the wire electrode 2, and the motor 20 is halted so that the gripping portion 110 comes to a state of rest. Lines (10) and (8) show the above sequence. When this has occurred the end of the wire electrode is in position between the feed rollers 16, as shown in FIG. 10, so that the wire electrode can be fed into the repair apparatus 17 thereby.

In accordance with the present invention as described above, that portion of a broken wire electrode on the supply side can be clamped assuredly to prevent the wire from falling under its own weight, and the end of the wire on the supply side can be positioned at a predetermined location. The wire electrode therefore will not remain in the workpiece upon wire breakage, and the wire electrode can be inserted back into the workpiece and set in the upper guide and feed mechanism in a simple manner. The above sequence which commences with breakage of the wire is accomplished fully automatically.

While the present invention has been described and illustrated in connection with a preferred embodiment in which the position of the wire electrode is held stationary while the workpiece only is moved by the motors Mx, My to effect the machining of the workpiece, it is obvious that the invention can be applied to a wire electrode-type electric spark machine in which the workpiece is held stationary and the position of the wire electrode moved, or in which both the workpiece and wire electrode are moved, during the machining operation.

As many apparently widely different embodiments of the present invention may be made without departing from the spirit and scope thereof, it is to be understood that the invention is not limited to the specific embodiments thereof except as defined in the appended claims.

What we claim is:

1. An electric spark machine for machining a workpiece by an electric spark generated between the workpiece and a flexible, elongated electrode which is fed longitudinally from a first side of the workpiece to a second side of the workpiece to provide a fresh supply thereof while predetermined relative motion is established between the workpiece and the electrode, which comprises:

clamping mechanism means for clamping the electrode when the electrode breaks, the portion of the electrode which is clamped being on the first side of the workpiece, wherein the clamping mechanism means comprises a block having an inwardly tapered surface, a pair of rollers between which said electrode passes, said rollers being mounted to move between a first position in which said rollers contact said inwardly tapered surface and a second position in which said rollers are spaced apart from said inwardly tapered surface, whereby said electrode is permitted to pass through said clamping mechanism means in only one direction when said rollers are in said first position and said electrode is unclamped when said rollers are in said second position; and electrode feed mechanism means for receiving the broken electrode clamped by the clamping means and moving the broken end thereof to a predetermined position on the second side of the workpiece.

2. An electric spark machine according to claim 1, wherein the electrode feed mechanism means comprises a pair of movably mounted rotatable drive rollers between which said electrode passes, said drive rollers being spaced away from the electrode during a machining operation, and means for moving said rollers toward each other during an electrode repair operation and for rotating said rollers to move the end of the broken electrode away from said predetermined position and then to move the end of the broken electrode to said predetermined position.

3. An electric spark machine according to claim 2, further comprising a nozzle between the workpiece and said drive rollers, the end of the electrode moved by said electrode feed mechanism means being inserted through said nozzle.

4. An electric spark machine according to claim 1, further comprising:

electrode pull-up mechanism means for gripping the end of the electrode which has been passed through the workpiece by said electrode feed mechanism means and pulling the end of the electrode to a second predetermined position on the second side of the workpiece.

5. An electric spark machine according to claim 4, which further comprises a conduction pin for supplying the electrode with electric power, and retraction mechanism means for moving said conduction pin to a displaced position at which the conduction pin will not contact the electrode, the conduction pin being retracted to said displaced position when the electrode is being pulled up by said electrode pull-up mechanism means.

6. An electric spark machine according to claim 1, 3, 4, or 5, wherein the wire electrode feed mechanism means comprises means for moving the broken electrode away from the workpiece and then toward the workpiece, and further comprising position detector means positioned between the workpiece and the electrode feed mechanism means for detecting the broken end of the electrode when the electrode feed mechanism means moves the broken end of the electrode away from the workpiece.

7. An electric spark machine according to claim 6, wherein the inwardly tapered surface at said block is provided by a generally V-shaped symmetrical recess within the block, said wire extending substantially along the axis of symmetry of the recess, wherein on either side of the axis of symmetry the block has an elongated opening that communicates with the recess and is substantially parallel to the axis of symmetry, wherein the rollers are annular and have internal openings therein, and wherein the clamping mechanism means additionally comprises a pair of cylinders movably extending through the elongated openings of the block and through the internal openings of the annular rollers, the diameters of the cylinders being less than the dimensions of the internal openings of the annular rollers.

8. In an electric spark machine for machining a workpiece by an electric spark generated between the workpiece and an elongated electrode which is fed longitudinally through an opening in the workpiece to provide a fresh supply thereof, the electric spark machine having an electrode supply side and an electrode take-up side, while a prescribed relative motion is established between the workpiece and the electrode, an apparatus for automatically repairing a broken electrode which comprises:

an electrode feed mechanism to feed the electrode so that the broken end thereof on the supply side is brought into agreement with a predetermined position on the electrode take-up side of the workpiece after the electrode breaks;

electrode pull-up mechanism means for gripping and for pulling up to a predetermined position the broken end of the electrode which has been passed through the opening in the workpiece by said electrode feed mechanism; and an electrode clamping mechanism provided on the electrode supply side and including:

a block having a recess with inwardly tapered side surfaces, the shape of the recess being generally trapezoidal when viewed in section, the block additionally having a slit, through which the electrode is passed, communicating with the recess;

a pair of rollers disposed within said recess to clamp the electrode; and electromagnetic mechanism means for selectively bringing said pair of rollers to a clamping position where the rollers contact the tapered surface, of the recess and to an unclamping position where the rollers do not contact the tapered surfaces of the recess, whereby the electrode is permitted to move in only one direction, from the electrode supply side to the electrode take-up side, when said pair of rollers is in said clamping position.

9. The apparatus for automatically repairing a broken electrode in an electric spark machine according to claim 8, further comprising an electrode position sensing device, provided between the workpiece and said electrode feed mechanism in the path along which the electrode travels, for sensing the broken end of the electrode on the electrode supply side.

10. The apparatus for automatically repairing a broken electrode in an electric spark machine according to claim 9, further comprising: a memory in which the amount of electrode feed is set, and sending means for sensing the amount of electrode movement, the electrode being fed by the set amount so that the broken end of the electrode is moved to the predetermined position on the electrode take-up side of the workpiece to be clamped by said electrode pull-up mechanism means.

* * * * *

UNITED STATES PATENT AND TRADEMARK OFFICE
CERTIFICATE OF CORRECTION

PATENT NO. : 4,347,423

DATED : August 31, 1982

INVENTOR(S) : Katsube et al.

It is certified that error appears in the above—identified patent and that said Letters Patent is hereby corrected as shown below:

Title page, [54] "ELECTRIC DISCHARGE MACHINE" should be --APPARATUS FOR AUTOMATICALLY REPAIRING A BROKEN ELECTRODE IN AN ELECTRIC SPARK MACHINE--;

[57] ABSTRACT, line 23, "the grips" should be --then grips--.

Col. 6, line 26, "82" should be --87--.

Signed and Sealed this

Fifteenth Day of February 1983

[SEAL]

Attest:

GERALD J. MOSSINGHOFF

Attesting Officer

Commissioner of Patents and Trademarks